G. H. RHODES.
DISTRIBUTING AND MEASURING APPARATUS.
APPLICATION FILED OCT. 26, 1914.
1,179,336.
Patented Apr. 11, 1916.
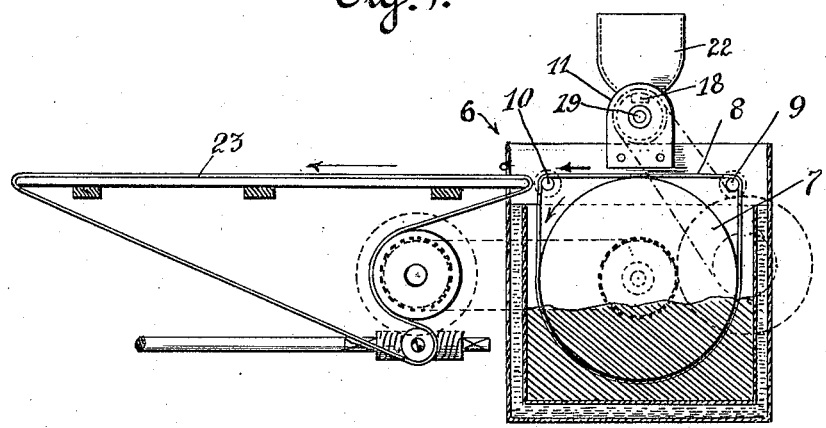
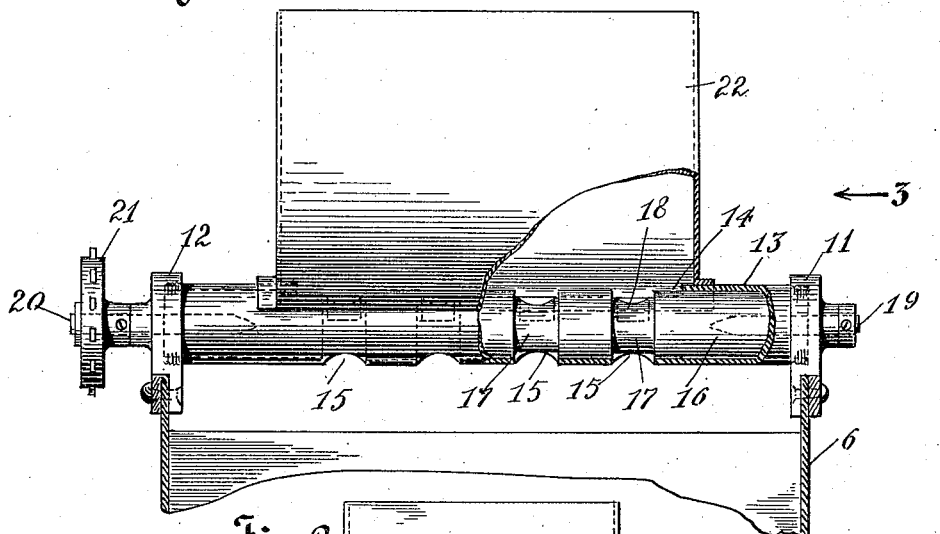
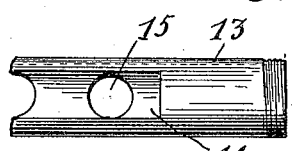
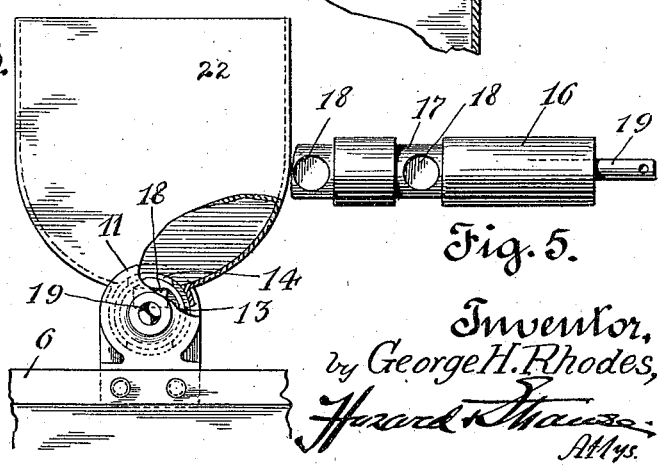
Witnesses,
Inventor,
by George H. Rhodes,
Attys.

UNITED STATES PATENT OFFICE.

GEORGE H. RHODES, OF LOS ANGELES, CALIFORNIA, ASSIGNOR TO BISHOP & COMPANY, A COPARTNERSHIP CONSISTING OF ROLLAND P. BISHOP, WILLIAM T. BISHOP, AND JOSEPH O. KOEFFLI, ALL OF LOS ANGELES, CALIFORNIA.

DISTRIBUTING AND MEASURING APPARATUS.

1,179,336. Specification of Letters Patent. Patented Apr. 11, 1916.

Application filed October 26, 1914. Serial No. 868,616.

*To all whom it may concern:*

Be it known that I, GEORGE H. RHODES, a citizen of the United States, residing at Los Angeles, in the county of Los Angeles, State of California, have invented new and useful Improvements in Distributing and Measuring Apparatus, of which the following is a specification.

This invention relates to a distributing and measuring apparatus, and particularly pertains to a mechanism for automatically coating nut kernels with chocolate in candy manufacture.

It is the object of this invention to provide an apparatus by means of which nut kernels, such as peanuts and the like, may be accurately measured and delivered in piles to a chocolate coating mechanism.

A further object is to provide a feed roller and mounting therefor so that nut kernels and other granular material may be distributed in uniform piles throughout the area of a constantly moving chocolate conveying belt, whereby the kernels are coated with chocolate, thus producing a mechanism by means of which the chocolate coating operation may be effected mechanically and with a rapid output.

The invention is illustrated in the accompanying drawing, in which:

Figure 1 is a view in diagram showing an apparatus constructed in accordance with this invention partly in section and partly in elevation. Fig. 2 is a view in side elevation of the measuring and distributing roll as disposed at the discharge end of a feed hopper, portions being broken away. Fig. 3 is an end view as seen in the direction indicated by the arrow 3 in Fig. 2, with parts broken away. Fig. 4 is a plan view of an end portion of the measuring and distributing roll casing. Fig. 5 is a detail in plan of a portion of the measuring and distributing roll.

More specifically, 6 indicates a chocolate reservoir adapted to contain molten chocolate and in which a drum 7 is revolubly mounted. A thick reticulated belt 8 passes around the drum 7 and over a pair of spaced rollers 9 and 10 by means of which the under surface of the upper horizontally disposed portion of the belt contacts with the peripheral surface of the drum 7. Mounted on the opposite sides of the reservoir 6 is a pair of bearings 11 and 12 which are formed with internally threaded recesses on their inner faces to receive correspondingly threaded ends of a tube 13 which extends across the reservoir 6 centrally thereof and in transverse relation to the belt 8. The tube 13 is formed with a longitudinally extending slot 14 on its upper side and has a series of spaced circular apertures 15 on its lower side which open above the belt 8.

Extending through the tube 13 is a feed cylinder 16 which is formed with a series of annular channels 17 arranged opposite the perforations or apertures 15 and formed in the bottom walls of the channel 17 are depressions or pockets 18; a pocket 18 being provided in each channel 17 and the series of pockets being arranged in longitudinal alinement so as to register simultaneously with the slot 14 and the apertures 15 in the tube 13.

The feed cylinder 16 is provided with trunnions 19 and 20 which extend through the bearings 11 and 12 on the longitudinal axis of the feed cylinder 16. The trunnion 20 is fitted with a sprocket wheel 21 around which a sprocket chain is adapted to pass by which the cylinder 16 may be rotated. Arranged above the tube 13 is a hopper 22 for the reception of nut kernels or other loose granular materials.

In the operation of the invention, the belt 8 and the cylinder 16 are rotated simultaneously by any suitable driving means. The drum 7 in passing through the molten chocolate within the receptacle 6 becomes coated therewith, thus conveying a quantity of chocolate to a point beneath the tube 13. The chocolate on drum 7 oozes through the belt 8 where it is in contact therewith below the tube 13. The belt 8 does not carry the chocolate from reservoir 6, the meshes in the belt being too large and the chocolate falling from the belt. Kernels position themselves in channel 17 ready to fall into the pockets 18 as they pass beneath the slot 14 communicating with the discharge end of the hopper 22, thereby permitting a measured quantity of the nut kernels or other materials contained in the hopper to be deposited within the pockets 18 and carried around with the cylinder 16. The channels 17 serve to arrange the kernels for starting them into pockets 18 and insure the pockets being filled each time they pass beneath the slot 14. The nuts are preserved in their whole condition and are not broken in the measuring device. In measuring devices employing a hopper and a rotary feed cylinder provided with pockets, some of the nuts are cracked due to the shearing action of the wall of the pockets and the sides of the hopper. By using a cylinder with channels 17, pockets 18 and a tube 13, nuts which become disposed between the walls of the pockets 18 and the tube 13 have room to turn in channel 17 and thus arrange themselves so that they will not be sheared or cracked. When the pockets 18 are moved into register with the apertures 16 in the tube 13 the contents thereof are discharged through the apertures 15 and deposited in piles on the upper face of the belt 8 where they become embedded in the body of chocolate forced upwardly through the mesh of the belt by drum 7, thereby forming a chocolate binding bottom for the pile of nuts deposited. The chocolate hardens and adheres to the nuts forming a conglomerate of chocolate and nuts. The belt 8 in advancing carries the nuts and with them the chocolate bottom over the roller 10 where they are engaged by a conveyer belt 23 rotated in any suitable manner by means of which the chocolate coated materials are conveyed to any suitable point, such as a device which directs chocolate in a stream over the piles completing the coating.

What I claim is:

1. A measuring and distributing device, comprising a horizontally extending tube having a longitudinal slot on its upper side and an opening on its lower side, a hopper having its discharge end opening to the slot in the tube, and a revoluble cylinder mounted in the tube formed with annular channels and having depressions in the bottom of the channels adapted to receive granular materials from the hopper and to discharge same through the opening in the tube on the rotation of the cylinder.

2. A measuring and distributing device, comprising a horizontally extending tube having a longitudinal slot on its upper side and a series of apertures on its lower side, a hopper having its discharge end opening to the slot in the tube, and a revoluble cylinder mounted in the tube formed with annular channels registering with the apertures in the tube having alined depressions in the bottom of the channels adapted to receive granular materials from the hopper and to discharge same through the apertures in the tube on the rotation of the cylinder.

In witness that I claim the foregoing I have hereunto subscribed my name this 12th day of October, 1914.

GEORGE H. RHODES.

Witnesses:
MARGUERITE BATES,
MARIE BATTEY.

Copies of this patent may be obtained for five cents each, by addressing the "Commissioner of Patents, Washington, D. C."